United States Patent [19]

DiSalino

[11] 4,033,248
[45] July 5, 1977

[54] AUTOMATIC COFFEE MAKER

[76] Inventor: Marco DiSalino, 129 E. 90th St., New York, N.Y. 10028

[22] Filed: Aug. 18, 1976

[21] Appl. No.: 715,398

[52] U.S. Cl. .................................. 99/281; 99/321
[51] Int. Cl.² ........................................ A47J 31/00
[58] Field of Search .... 99/281, 279, 280, 282–283, 99/284, 288, 290–291, 295, 298–299, 300, 304–305, 306, 316–317, 318–319, 320–321, 323

[56] References Cited

UNITED STATES PATENTS

| 663,361 | 12/1900 | Phelan et al. | 99/323 UX |
|---|---|---|---|
| 1,543,340 | 6/1925 | Newberry | 99/321 X |
| 3,552,298 | 1/1971 | Bufkin et al. | 99/281 |
| 3,587,444 | 6/1971 | Godel et al. | 99/282 |
| 3,606,829 | 9/1971 | Alwood | 99/280 |
| 3,693,535 | 9/1972 | Abel, Jr. | 99/282 |
| 3,878,360 | 4/1975 | Augustine et al. | 99/281 X |

Primary Examiner—Harvey C. Hornsby
Assistant Examiner—Arthur O. Henderson

[57] ABSTRACT

An improved coffee maker that prevents leakage of water between the cover for the water reservoir at the top of the device because of steam pressure that may cause a "short" in the electrical system or cause other damage; prevents the wall of the paper filter within the basket to collapse; prevents shooting of the hot water directly into the basket containing the coffee; permits the lower part of the basket containing the silk screen to be removed for cleaning and easy replacement if the silk screen within such lower part is punctured or otherwise damaged; permits the water spreader of the basket to be easily removed for cleaning; prevents water or coffee from leaking to or through the warming unit at the base of the coffee maker upon which the carafe rests which may interfere with the electrical wiring in the warming unit and possibly cause a short and do other damage; and provide certain shields for parts against excessive heat and hot water that may cause injury to the user of the device.

9 Claims, 10 Drawing Figures

AUTOMATIC COFFEE MAKER

BACKGROUND OF THE INVENTION

This invention relates to an automatic coffee making device which employs the use of hot water before contacting the coffee. There are a number of coffee makers of this type on the market but each of such devices has a number of defects or faults that cause the user inconvenience and difficulty during use of the device. For example, when the water begins to boil the pressure of the steam between the cover at the top and the walls of the water reservoir causes water or steam to leak down the outside of the coffee maker which may contact the electric wires so that a short may occur, the metal may rust and cause other difficulties and inconvenience. Also, the outlet at the base of the water reservoir permits the hot water to shoot directly down into the basket containing the coffee causing splashing of the hot water. The wall of the paper filter within the basket beneath the water reservoir often collapse so that the hot water passes between the paper filter and the basket and not directly onto the coffee grind. The slik screen at the base of the basket is permanently attached to the basket and is difficult to clean. The screen is often accidently punctured and since it is attached to the entire basket, a new basket must be purchased and replaced at an added cost and the inconvenience of obtaining a new basket. The water spreader which is attached to the basket is difficult for the user to remove as presently constructed and has other defects which require improvement. The warming unit at the base of the coffee maker also requires improvement since it permits water to leak through the base and reach the surface upon which the carafe rests.

I have, therefore, made a number of improvements to cure the defects and faults above mentioned which inconvenience the user making coffee with such coffee devices on the market at the present time so that such difficulties, among others, are eliminated and the making of coffee with my improved coffee maker becomes easy and a pleasure for the user.

The above and other objects of the invention will become more apparent when considered in view of the following specification and drawings.

DESCRIPTION OF THE PREFERRED EMBODIMENTS OF THE INVENTION

The present invention provides a coffee maker 10 comprising an upper housing, opposite vertical support walls 79 and a back plate 80 which covers a hollow compartment between said vertical support walls 79, said upper housing having walls 15 and having a top cover 11 for such upper housing which has a depending inwardly angled flange 12 extending around the cover set back from the outer edge 13 of the cover providing a shoulder 14 the width of the thickness of the wall 15 so as to make a fairly tight fit with the inner edge of wall 15 which contains the water reservoir 16 within the upper part of the coffee maker 10. Cover 11 has a shallow circumferential depressed portion 17 to receive the bottom of the filter housing 18 which is removably attached to the basket 19. Basket 19 has a shoulder 19' for seating the basket upon the upper edge of the carafe 20. Depressed portion 17 of the cover is a convenient place to place the basket 19 with its filter housing 18 when the basket is removed from the glass carafe 20. Any moisture or coffee dripping will accumulate within the depressed portion 17 and can be readily washed off when the cover 11 is washed. The inwardly angled flange 12 permits any moisture which may collect on the inside of cover 11 or between the flange 12 and wall 15 to flow into the compartment 21' containing the water reservoir 16 thus keeping the outer walls 15 dry and preventing water from flowing out of the upper housing and onto any of the switches and electrical wiring hereinafter described to avoid electrical shorts.

Walls 15 provide the compartment 21' within which there is the reservoir 16 to receive water for coffee making. A bottom 22 acts to support the bottom 25 of the reservoir 16 and the compartment unit 21 by means of two opposed metal support arms 28 which are attached to the outer walls of compartment unit 21 and which have their ends 29 bent inwardly to receive a screw 29 in a screw hole to fasten and adjust the tightness and seating of the unit 21. The compartment unit 21 has an outwardly directed flange 24 which is also supported by an inwardly projecting shoulder 23. There is a space 21' between the compartment unit 21 and the water reservoir 16 acts as air insulation around the reservoir 16 and collects any moisture which may accumulate within the space 21'. The bottom 25 of water reservoir 16 is attached to the bottom 26 of the compartment unit 21, preferably by spot welding, and both the compartment unit 21 and the reservoir 16 are preferably made of thin stainless steel. Water reservoir 16 has numerals and lines die stamped in the metal to indicate the water level for 4, 6, 8 and 10 cups of water for making coffee. A heating coil 27 is welded to the bottom 26 of compartment unit 21 which supplies heat to the metal bottoms 25, 26 thus heating the water within the water reservoir 16 when desired. Compartment unit 21 has an outwardly directed upper flange 24 for seating the compartment unit 21 upon shoulder 23.

A circular member 30, preferably of a ceramic material, is located along the central medial line in the circular opening of the bottom 25 of the water reservoir. Member 30 has an outwardly directed flange 31 which permits the seating of member 30 upon the short extension 32 of the circular opening of the bottom of compartment unit 26. Member 30 has a depressed circular chamber 33 and a circular pipe 34 which extends shortly below bottom wall 22 and communicates with chamber 33. Within the upper part of circular chamber 33 and member 30 there is a stainless steel metal plate 35 which has a series of fine openings 36 to permit the heated water within the reservoir 16 to enter into the member 30, chamber 33 and pipe 34. A rubber sleeve 37 surrounds pipe 34 and acts as an insulator for pipe 34. A circular metal depending flange 38 is attached to the bottom 26 of compartment unit 21 and acts as a heat shield to prevent a certain amount of the heated air from heating coil 27 to pass between the coil 27 and rubber sleeve 37. A thermal valve 33' well-known in the art, is in the bottom of the water reservoir within the member 30 and opens and allows the heated water to start to drain out of the reservoir when it reaches a predetermined temperature. Attached to bottom 22 of compartment 21 is a circumferential depending outwardly dished flange 39 which prevents the splashing of the hot water when it leaves the pipe 34 and may contact and injure the user. Electric wires 40, 41 are attached to each end of heating coil 27 to heat the coil by movement of an "on-off" switch as will be hereinafter more specifically described. The hollow compartment between the vertical walls 79 contains most of the electrical wiring (not fully shown) for automatically operating the various electrical parts mentioned herein.

The carafe 20 with its basket 19 and spreader cover 44 therein is centrally placed upon a metal circular warming plate 42 which is attached to the base 43 of the coffee maker 10 so that it is centered directly beneath circular pipe 34. The warming plate 42 has a short vertical wall 45 and an outwardly directed flange 46 providing an air space 47 between flange 46 and the horizontal platform 48 at the base of the device. Platform 48 has a circular opening spaced from the wall 45 of plate 42 permitting circulation of air from the raised bottom walls 48 and between the air space 47 and platform 48 and wall 45 thus keeping the heat created by warming plate 42 from effecting the plastic walls and housing around the plate 42. Flange 46 also helps to retain the carafe 20 on the plate 42 which also collects any possible spillage of water or coffee and prevents same from reaching the electrical wiring associated with the warming plate 42. Warming plate 42 has a metal heating coil 89 attached to its underneath surface which is enclosed in a bottom cover plate 49 attached to plate 42. Warming plate 42 with its cover plate 49 is attached preferably by screws 90 at the corners to the housing of the device. A thermostatic control T2 shown in FIG. 10 well-known in the art, is attached to the warming plate 42 to maintain a temperature to keep the coffee within the carafe at a desired temperature for serving.

Spreader cover 44 is preferably circular and is adapted to fit snugly upon the upper part of circular basket 19 and comprises a horizontal member 50 which extends slightly beyond the outer wall 51 of basket 19 so that it may be easily lifted off basket 19 by the fingers of the user. It has a downwardly directed depending circular flange 52, the outer edge of which is slightly tapered inwardly so that it fits tightly upon the top of the basket 19 and within the upper edge of said basket 19. It also has a large dished circular central portion 53, the angular wall 54 of which extends above the upper surface of cover member 50 to catch all the hot water that shoots out of pipe 34 due to the pressure. The openings 56 on the bottom of said spreader cover permit such hot water to enter basket 19 through the small tapered openings 56 adjacent the outer portion of bottom 55 so that very little heat and pressure within the basket 19 is lost. The hot water then passes downward into a dished plastic cover member 57 for a circular plastic filter support wall member 58. Cover member 57 breaks the force of the hot water entering and has a large number of small openings on its bottom 59 which permits the hot water to enter into the support wall member 58. Cover member 57 has a circumferential flange 57' for seating the cover upon the upper edge of the support wall member 58. Member 58 has no bottom and has a large number of small openings 60 in the circular wall 61 so that the hot water passes into the cup-shaped paper filter 62 which contains the coffee grind (not shown). If the fluted circumferential wall of the paper filter 62 is not supported, it often collapses and the hot water passes between the collapsed filter paper wall and the inner wall of basket 19 so that the hot water does not extract much of the coffee brew within the paper filter. By placing the cup-like support 58 within the paper cup filter 62 the circumferential wall of the paper filter 62 cannot collapse. Thus, the hot water acts on all the coffee grind within the cup-type filter 62.

The paper cup-type filter 62 with the ground coffee is placed within basket 19 and rests upon the silk screen 68 on the bottom of the shallow cap unit 66. The lower outer end of basket 19 has a threaded portion 65 to receive a circular inwardly threaded shallow cap unit 66 which has several radiating cross ribs 67 upon which there is a fine silk screen 68 through which the coffee extract flows into the carafe 20. Very often the silk screen is punctured and must be placed or it may have to be cleaned from time to time if it is not washed frequently and foreign matter accumulates to clog up the fine pores of the silk screen 68. In the baskets heretofore used the silk screen was part of the entire basket and the complete basket had to be replaced. In the present invention only the threaded shallow cap 66 need be replaced and can easily be unscrewed by the user.

After all the coffee has drained into the carafe 20, a cap 69, preferably made of plastic and having a depending flange 70 adapted to fit within the neck of the carafe, may be placed on the carafe and turned so that opening 71 in the flange lines up with the pouring spout 72 to permit pouring of the coffee with cap 69 on the carafe. Flange 70 also has a self biased detent 83 which has a slot 84 to provide a spring effect to flange 70 so that it remains tightly in the neck of carafe 20 when the beverage is poured.

Carafe 20 has a downwardly sloping handle 73 with a plastic strengthening member 74 sloping at the same angle as the sloping wall of the carafe for holding the filled carafe more firmly and rigidly. A wide metal band 75, with inwardly bent ends, circumscribes the neck portion of the carafe 20 and is attached to the handle 73 by a long screw 76 passing through the upper part of handle 73 and the inwardly bent ends of metal band 75 and may be tightened through a nut (not shown). Handle 73 is spaced somewhat away from the sloping wall of the carafe so that when the fingers of the user grasp the depending handle 73, the users fingers are sufficiently far from the wall of the carafe to avoid the heat of the carafe containing the hot coffee.

Figure 1:
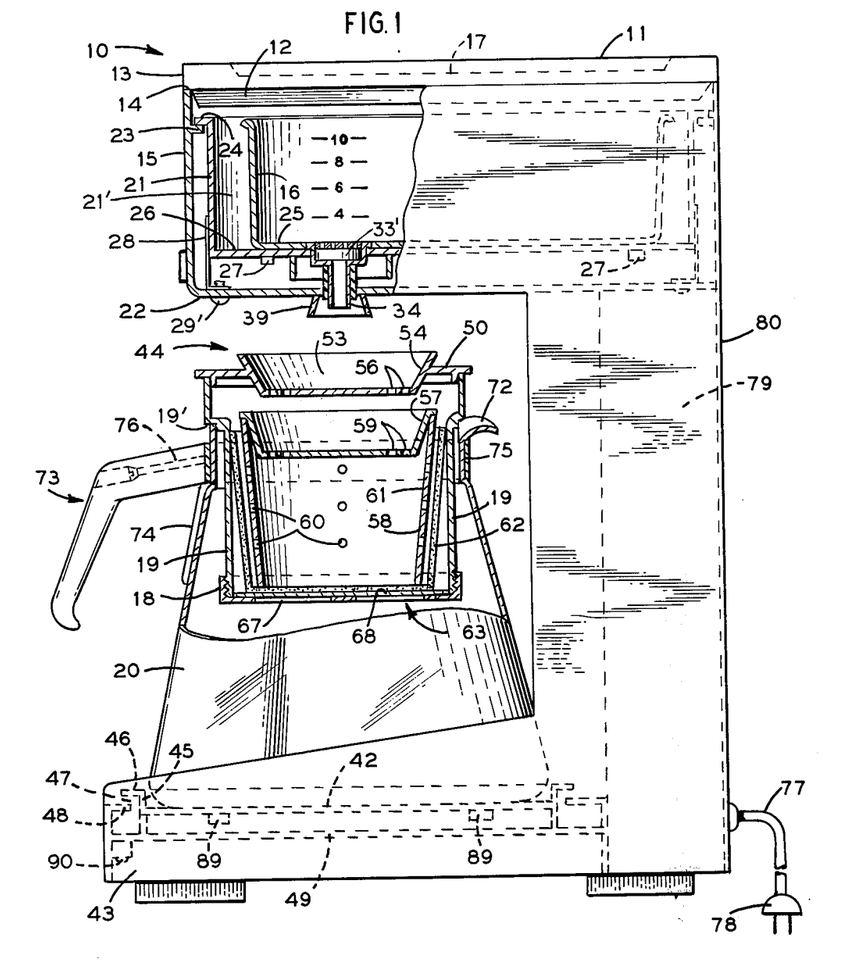
FIG. 1 is a side elevational view of the coffee maker showing the various assembled parts on the warming unit with portions in section and parts cut away to reveal various construction details.
Figure 2:
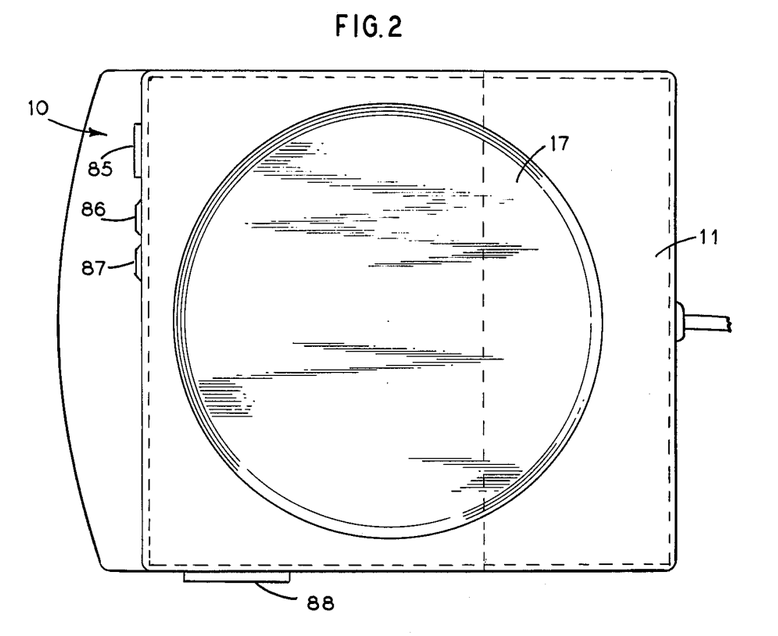
FIG. 2 is a top plan view of the coffee maker with the cover removed to show the water reservoir within the upper compartment.
Figure 3:
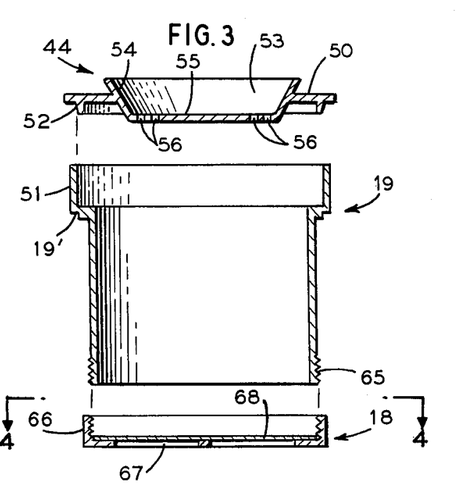
FIG. 3 is an exploded sectional view showing the spreader, the basket and the removable filter cap unit.
Figures 4, 10:
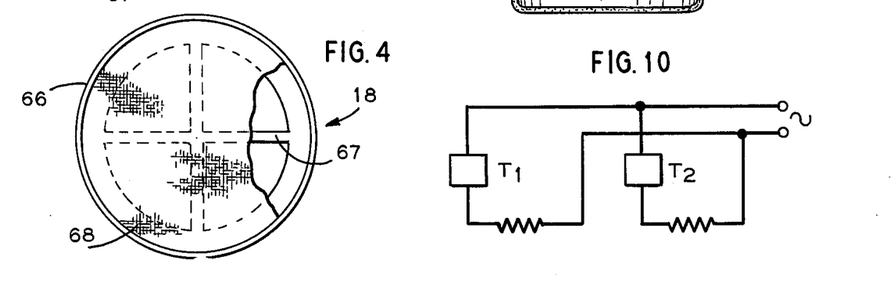
FIG. 4 is a plan view of the lower filter cap unit.
FIG. 10 is a wiring diagram of the thermostat control heating elements.
Figure 5:
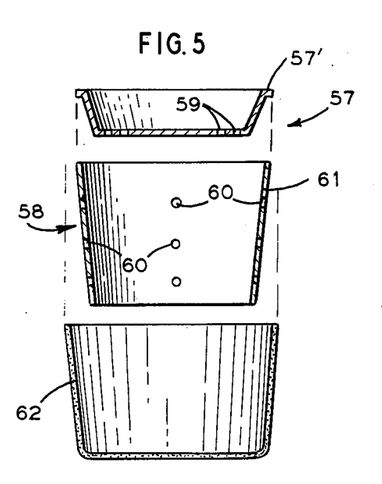
FIG. 5 is an exploded sectional view showing the cover for the paper filter support, the support for the paper filter unit and the paper filter.
Figure 6:
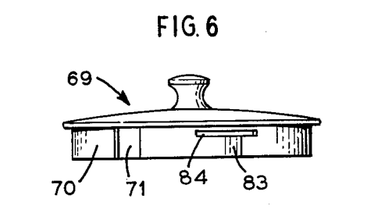
FIG. 6 is a side view of the cover or cap for the carafe.
Figure 7:
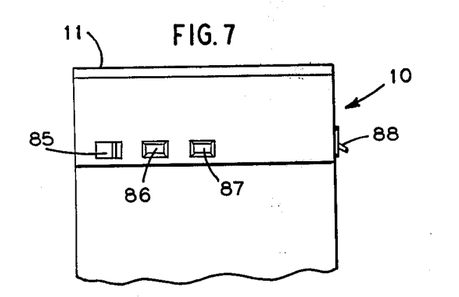
FIG. 7 is a front view of the top portion of the coffee maker showing the switches and lights.
Figure 8:
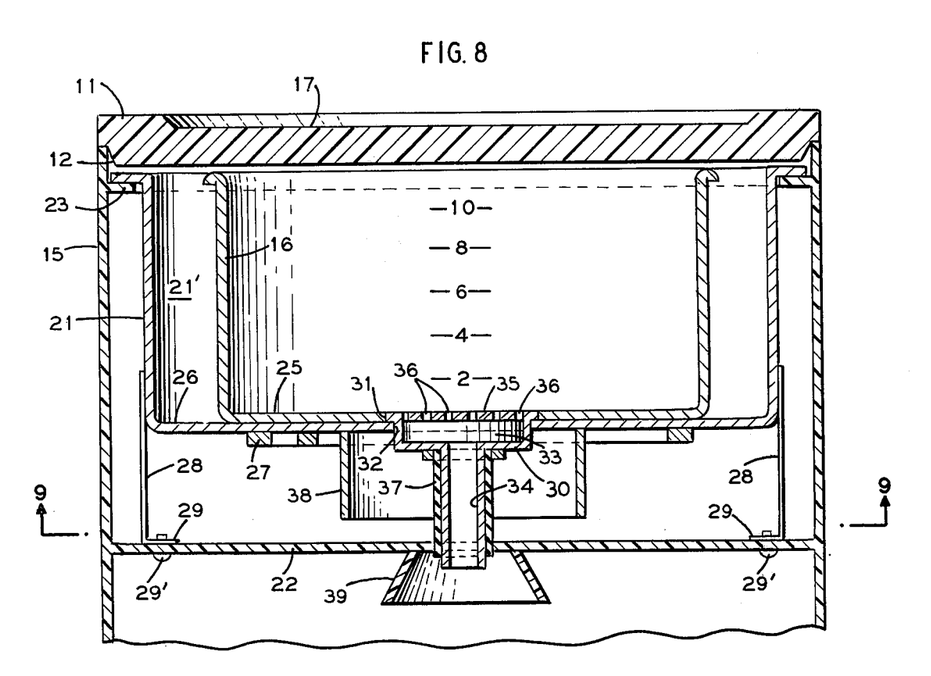
FIG. 8 is an enlarged sectional view of the upper portion of the coffee maker housing unit and the parts therein.
Figure 9:
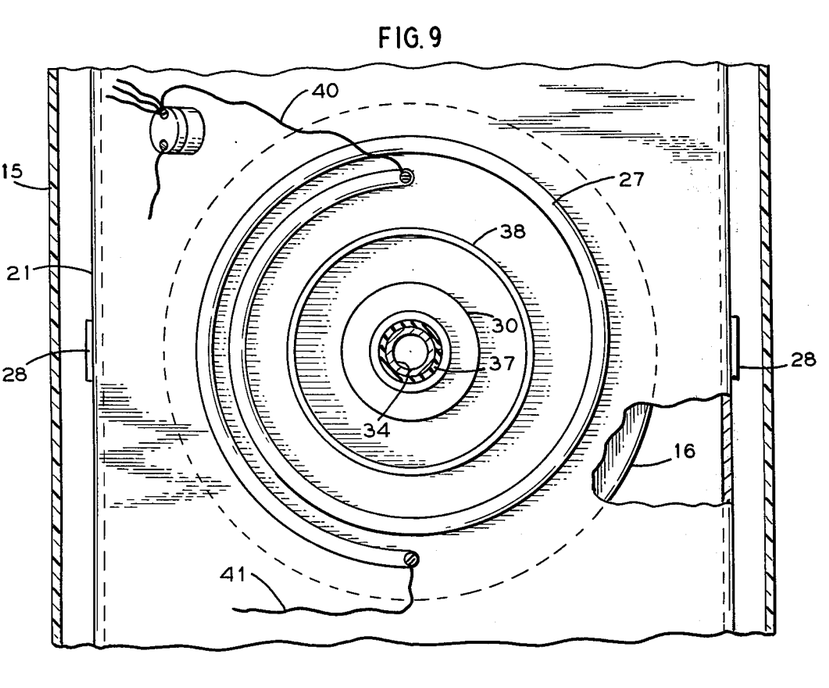
FIG. 9 is a bottom view taken along line 9—9 of FIG. 8.

At the lower front of the upper housing which contains the water reservoir 16 there are several switches and lights namely, "off-on" switch 85, a "warm" light 86, a "brew" light 87, /and a "push to brew" switch 88, which are all well-known in the art of coffee making machines. These switches and lights are properly wired as shown in FIG. 10 so that they operate the coffee maker in accordance with the following instructions.

In order to properly use the coffee maker of this invention, the following steps should be taken.

Remove the top cover 11 from the water reservoir 16 and fill the glass carafe 20 with cold water and pour it into the water reservoir 16 to the desired level indicated on the inside of the upright wall of the reservoir for making four to ten cups of coffee and replace the cover 11 on the top of the device. Place the paper filter cup 62 in the basket 19 and add the desired amount of coffee. A general measure of regular grind coffee is two level measuring tablespoons for each cup. For a weaker brew, water is added to the carafe 20 after the cycle is completed and for a stronger brew the amount of water is decreased slightly. Then place the filter support member 58 into the filter cup 62 which will support the upright wall of the paper cup. The cover member 57 is then placed on the support member 58. The spreader cover 44 is then placed on top of basket 19. The basket 19 and spreader assembly is then placed onto the empty glass carafe 20. Carafe 20, with its basket 19 and spreader cover 44 assembly, is then placed under the circular pipe 34 and centered on the warming plate 42. The electric cord 77 with its plug 78 is then placed into an electric outlet and the switch 85 is turned to the on position. The warming plate 42 will begin to heat and the WARM light 86 will show. The "push to brew" switch 88, and indicated as T2 in FIG. 10, which is on the side wall of the upper housing portion containing the water reservoir, is then depressed and the water in the reservoir 16 will begin to heat and the brew light 87 will show. If the brew switch has been accidentally turned on with no water in the reservoir, the plug 78 should be promptly disconnected from the electric outlet and the reservoir 16 should be allowed to cool and then water should be added to the reservoir. Plug 78 should then be plugged into the outlet again.

The thermostat T1 themostatically controls the main unit and heats the water. The thermal valve T1 indicated in FIG. 10 in the bottom of the reservoir 16 opens and allows the heated water to start to drain and enter the spreader cover 44 which distributes the hot water evenly through the cover member 57 and into the filter support wall member 58. The hot water then passes through the small openings 60 onto the coffee grind within the paper filter 62. The coffee is then filtered and drips through the silk screen 68 which acts as a second filter and then passes into the glass carafe 20.

The main heating unit (not shown) and well known in the art will turn off automatically when the water has been heated to the proper temperature. The brew light 87 will go out but the warm light 86 will stay on which indicates that the warming unit 42 is still on. Sufficient time is allowed for brewing to be completed and all the hot water has filtered through the coffee grind.

Before the coffee is served, the carafe 20, with its basket and spreader assembly, is removed from the coffee maker. The basket-spreader assembly is removed from the carafe 20 and placed in the sink for cleaning up later. The coffee in the carafe 20 should be stirred before serving. The serving cover 69 is then placed on carafe 20 with its flange 70 within the neck of the carafe and the opening 71 is lined up with the pouring spout 72 of the carafe. After serving the coffee, the carafe is placed on the warming plate 42 to keep the coffee at serving temperature. When all the coffee has been served, the switch 85 is turned to off to disconnect the current.

If it is desired to immediately make another carafe of coffee, the electric cord 77 and plug 78 is kept in the wall outlet with the switch 85 turned to off. The basket 19, spreader assembly and carafe should then be washed and rinsed before repeating the above described operation. When brewing one carafe of coffee immediately after another, cold water should be used in order to reset the thermostat.

In order to clean the coffee maker, it is unpluged and the warming plate is allowed to cool. The outside and base is cleaned with a damp cloth and then dried with a dry cloth. The coffee maker unit is not to be immersed in water. The carafe, basket, spreader and serving cover is cleaned in hot soapy water with a dish cloth and then thoroughly rinsed with clear water and permitted to dry. If a lime deposit forms in the reservoir because of the hardness of the water used, white distilled vinegar may be used for the cleaning process by pouring about 10 ounces of the vinegar into the reservoir and adding about two cups of hot water and allow it to remain for about ½ hour. The carafe is then placed on the warming unit 42 and the plug 78 is placed into the wall outlet and both switches 85 and 88 are turned to ON and the coffee maker is permitted to complete its cycle. The switch 85 is then turned off and solution is discarded. To rinse, the reservoir is filled with cold water to the 10 cup level and the switch 85, 88 are turned to ON to cycle the coffee maker. If the coffee maker should begin to drip, a distilled vinegar solution should be used to clean it.

The front legs 81 and back legs 82 of the beverage maker are set inwardly from the front and rear of the device and are sufficiently high so that the bottom of the base of the unit is off the surface upon which the beverage maker is placed to permit air to circulate beneath the base to prevent excessive heat from the warming plate 42 from damaging any surface upon which the unit is placed and to aid in keeping a circulation of air beneath the warming plate 42.

While this device is primarily designed to make coffee, it can also be used to make tea, bouillon, and cocoa. The cocoa mix, or bouillon granules, tea leaves or tea bag may be placed in the serving carafe or in the basket 19 and used as heretofore described.

I claim:
1. An automatic beverage maker comprising
    an upper housing, vertical support walls, a removable back and a base,
    a compartment unit and water reservoir within said upper housing,
    said upper housing having a bottom,
    a top cover for said upper housing, having means to direct any water or condensed steam from leaving said upper housing,
    a heating element for supplying heat to said water reservoir,
    a ceramic member having a central pipe passing through the bottoms of said compartment unit and said water reservoir, a thermal valve associated with said ceramic member to permit the heated water to drain from the reservoir,
a heat shield between said heating coil and pipe,
a circular flange on the bottom of said upper compartment unit surrounding the lower end of said pipe,
means to permit the heated water within the reservoir to enter said pipe,
a thermal valve to permit the heated water to drain out of said water reservoir,
a carafe for receiving the heated and filtered coffee,
a handle for said carafe,
a basket for seating upon said carafe,
a removable cap at the base of said basket,
said removable cap having a silk screen,
said basket having a circular spreader cover,
said spreader cover having a dished central portion,
openings on the bottom of said spreader cover,
a paper filter cup for positioning within said basket,
a support wall member within said paper filter cup,
said support wall member having opening, in its wall,
a dished cover for said support member,
said dished cover having openings to permit the hot water to drain into said support member, said filter cup and into said carafe,
a metal circular warming plate for placing said carafe thereon,
said base of said beverage maker having legs raising said base of said beverage maker above the surface upon which it rests,
electrical wiring and thermal control means to permit the water in said reservoir to be heated to the desired temperature and to maintain said warming plate at the desired temperature for serving beverage.

2. An automatic beverage maker according to claim 1, said beverage maker comprising
an upper housing, vertical support walls, a removable back and a base,
a compartment unit for said upper housing,
said upper housing having a bottom,
a water reservoir within said compartment unit,
a top cover for said upper housing having means to direct any water or condensed steam from leaving said upper housing,
a heating element for supplying heat to said water reservoir,
a ceramic member having a central pipe passing through the bottoms of said compartment unit and said water reservoir,
a thermal valve associated with said ceramic member to permit the heated water to drain from the reservoir,
a heat shield between said heating coil and pipe,
a circular flange on the bottom of said upper compartment unit surrounding the lower end of said pipe,
means to permit the heated water within the reservoir to enter said pipe,
a thermal valve to permit the heated water to drain out of said water reservoir when said water reaches a predetermined temperature,
a carafe for receiving the heated and filtered coffee,
a handle for said carafe,
a basket for seating upon said carafe,
a removable cap at the base of said basket,
said removable cap having a silk screen,
said basket having a circular spreader cover,
said spreader cover having a dished central portion,
openings on the bottom of said spreader cover,
a paper filter cup for positioning within said basket,
a support wall member within said paper filter cup,
said support wall member having openings in its wall,
a dished cover for said support member,
said dished cover having openings to permit the hot water to drain into said support member, said filter cup and into said carafe,
a metal circular warming plate for placing said carafe thereon,
said base of said beverage maker having legs raising the base of said beverage maker above the surface upon which said coffee maker rests,
electrical wiring and thermal control means to permit the water in said reservoir to be heated to the desired temperature and to maintain said warming plate at the desired temperature.

3. An automatic beverage maker according to claim 2, said beverage maker comprising
an upper housing, vertical support walls, a removable back and a base,
a compartment unit for said upper housing,
said upper housing having a bottom,
a reservoir for water within said compartment unit,
a top cover for said upper housing,
said top cover having means to direct any water or condensed steam from leaving said upper housing,
a heating element for supplying heat to said compartment unit and said water reservoir,
a ceramic member having a central pipe passing through the bottoms of said compartment unit and said water reservoir,
a thermal valve associated with said ceramic member to permit the heated water to drain from the reservoir at the desired temperature,
a heat shield between said heating coil and pipe,
a circular flange on the bottom of said upper compartment unit surrounding the lower end of said pipe,
means to permit the heated water within the reservoir to enter said pipe,
a thermal valve to permit the heated water to drain out of said water reservoir when said water reaches a predetermined temperature,
a carafe for receiving the heated and filtered coffee,
a handle for said carafe,
a basket for seating upon said carafe,
a removable cap at the base of said basket,
said removable cap having a silk screen,
said basket having a circular spreader cover,
said spreader cover having a dished central portion,
openings on the bottom of said spreader cover to permit the hot water to pass into said basket,
a paper filter cup for positioning within said basket,
a support wall member within said paper filter cup,
said support wall member having openings in its wall,
a dished cover for said support member,
said dished cover having openings to permit the hot water to drain into said support member, said filter cup and into said carafe,
a metal circular warming plate for placing said carafe thereon,
said base of said beverage maker having legs raising the base of said beverage maker to permit air to flow beneath said base and said warming plate, electrical wiring and thermal control means to permit the water in said reservoir to be heated to the desired temperature and to maintain said warming plate at the desired temperature, 4. An automatic beverage maker according to claim 3, said beverage maker comprising an upper housing, vertical support walls, a removable back and a base,
a compartment unit for said upper housing,
said upper housing having a bottom,
a reservoir within said compartment unit,
a top cover for said upper housing,
siad top cover having means to direct any water or condensed steam from leaving said upper housing,
a heating element for supplying heat to said compartment unit and said water reservoir,
a ceramic member for said water reservoir,
said ceramic member having a pipe passing through the bottoms of said compartment unit and said water reservoir,
a thermal valve associated with said ceramic member permitting the heated water to drain from the reservoir at the desired temperature,
a heat shield between said heated coil and pipe,
a circular flange on the bottom of said upper compartment unit surrounding the lower end of said pipe,
means to permit the heated water within the reservoir to enter said pipe,
a thermal valve to permit the heated water to drain out of said water reservoir when said water reaches a predetermined temperature,
a carafe for receiving the heated and filtered coffee,
a handle for said carafe,
a basket for said carafe,
a removable cap at the base of said basket,
said removable cap having a silk screen,
said basket having a circular spreader cover,
said spreader cover having a large shallow dished circular central portion,
openings on the bottom of said spreader cover to permit the hot water to pass into said basket,
a paper filter cup for positioning within said basket,
a support wall member within said paper filter cup to support the walls of said filter cup from collapsing upon receiving the hot water,
said support wall member having openings in its wall,
a dished cover for said support member,
said dished cover having openings therein to permit the hot water to drain into said support member and said filter cup and into said carafe,
a metal circular warming plate for placing said carafe thereon,
said base of said beverage maker having legs raising the base of said beverage maker to permit air to flow beneath said base and said warming plate,
electrical wiring and thermal control means to permit the water in said reservoir to be heated to the desired temperature and to maintain said warming plate at the desired temperature for serving beverage.

5. An automatic beverage maker according to claim 4, said beverage maker comprising an upper housing, vertical support walls, a removable back and a base,
a compartment unit for said upper housing,
said upper housing having a bottom,
a reservoir within said compartment unit,
a top cover for said upper housing,
said top cover having means to direct any water or condensed steam from leaving said upper housing,
means for firmly attaching said compartment unit to said upper housing,
markings on said water reservoir to indicate the level of 4, 6, 8 and 10 cups of water,
a heating element for supplying heat to said compartment unit and said water reservoir,
a ceramic member within said water reservoir,
said ceramic member having a central pipe passing through the bottom of said compartment unit, said water reservoir and slightly below the bottom of said upper housing,
a thermal valve within said ceramic member permitting the heated water to drain from the reservoir at the desired temperature,
said circular flange acting as a heat shield between said heating coil and pipe,
a depending circular flange on the bottom of said upper compartment unit surrounding the lower end of said pipe,
means to permit the heated water within the reservoir to enter said pipe,
a thermal valve within said ceramic member which permits the heated water to drain out of said water reservoir when said water reaches a predetermined temperature,
a carafe for receiving the heated and filtered coffee,
said carafe having a spout,
a handle for said carafe,
a circular basket for said carafe,
a removable cap at the base of said basket,
said removable cup having a silk screen,
said basket having a circular spreader cover,
said spreader cover having a dished circular central portion,
openings on the bottom of said spreader cover to permit the hot water to pass into said basket,
a paper filter cup for receiving the coffee grind and for positioning within said basket,
a support wall member for positioning within said paper filter cup to support and prevent the walls of said filter cup from collapsing upon receiving the hot water,
said support wall member having openings in its wall to permit the hot water to drain through the coffee grind within the filter cup,
a dished cover for said support member,
said dished cover having openings therein to permit the hot water to drain into said support member and said filter cup, and into said carafe,
a metal circular warming plate for placing said carafe thereon,
said base of said beverage maker having legs raising the base of said beverage maker to permit air to flow beneath said base and said warming plate,
electrical wiring means, thermal control means, lights and switches on said beverage maker to permit the water in said reservoir to be heated to the desired temperature, to open said thermal valve at the bottom of said compartment unit and said reservoir, to indicate heating of the water and the warming plate and to maintain said warming plate at the desired temperature for serving beverage.

6. An automatic beverage maker according to claim 5, said beverage maker comprising an upper housing, vertical support walls, a removable back and a base,
a compartment unit for said upper housing,
said upper housing having a bottom,
a water reservoir within said compartment unit,
a top cover for said upper housing,
said top cover having means to direct any water or condensed steam from leaving said upper housing,
means for supporting said compartment unit within said upper housing,
means for firmly attaching said compartment unit to said upper housing,
markings on said water reservoir to indicate the level of 4, 6, 8 and 10 cups of water,
a high wattage heating element below said water reservoir to heat said water to boiling temperature,
a ceramic member centrally located within and on the bottom of said water reservoir,
said ceramic member having a central pipe passing through the bottom of said compartment unit, said water reservoir and slightly below the bottom of said upper housing,
a thermal valve at the base of said compartment unit and said reservoir permitting the heat water to drain from the reservoir at the desired temperature,
said circular flange acting as a heat shield between said heating coil and pipe,
a depending circular flange on the bottom of said upper compartment unit,
said circular flange surrounding the lower end of said pipe,
means to permit the heated water within the reservoir to enter said pipe,
a thermal valve within said ceramic member which permits the heated water to drain out of said water reservoir when said water reaches a predetermined temperature,
a carafe for receiving the heated and filtered coffee, said carafe having a spout,
a metal band circumscribing said carafe neck,
a handle attached to said carafe to permit the fingers of the user to lift the carafe,
an extension member depending the same angle as the carafe wall at the inner end of said handle for strengthening said handle and firmly holding the carafe,
a circular basket for seating said basket upon said carafe,
a removable cup-like cap at the base of said basket,
said removable cap having a silk screen upon its bottom and ribs to support said silk screen,
said spreader cover having a dished circular central portion,
small openings on the bottom of said spreader cover to permit the hot water to pass into said basket,
a paper filter cup for receiving the coffee grind and for positioning within said basket and extending downward so that its bottom rests upon said silk screen,
a circular support wall member for positioning within said paper filter cup to support and prevent the walls of said filter cup from collapsing upon receiving the hot water,
said support wall member having small openings in its wall to permit the hot water to drain through the coffee grind within the filter cup,
a dished cover for said support member,
said dished cover having a number of small openings therein to permit the hot water to drain into said support member, said filter cup and into said carafe,
a metal circular warming plate for placing said carafe thereon,
said base of said beverage maker having legs raising the base of said beverage maker to permit air to flow beneath said base and said warming plate,
electrical wiring means, thermal control means and switches on said beverage maker to permit the water in said reservoir to be heated to the desired temperature, to open said thermal valve at the bottom of said compartment unit and said reservoir, and to maintain said warming plate at the desired temperature for serving beverage.

7. An automatic beverage maker according to claim 6, said beverage maker comprising
an upper housing, vertical support walls, a removable back and a base,
a compartment unit for said upper housing,
said upper housing having upright walls and a bottom,
a circular cup-shaped water reservoir within and attached to said compartment unit,
a top cover for said upper housing,
said top cover having a depending inwardly angled flange extending around said cover to direct any water or condensed steam from leaving said upper housing,
an inwardly directed shoulder within said upper housing and below the top of said walls thereof for supporting said outwardly directed flange of said compartment unit,
means for firmly attaching said compartment unit to said upper housing,
markings on said water reservoir to indicate the level of 4, 6, 8 and 10 cups of water,
a high wattage heating element attached to the bottom of said compartment unit to heat to said compartment unit and said water reservoir in said reservoir to boiling,
a ceramic member centrally located within and on the bottom of said water reservoir,
said ceramic member having a central pipe passing through the bottoms of said compartment unit, said water reservoir and slightly below the bottom of said upper housing,
a thermal valve at the base of said compartment unit and said reservoir permitting the heated water to drain from the reservoir at the desired temperature,
said circular flange acting as a heat shield between said heating coil and pipe,
a depending circular flange on the bottom of said upper compartment unit,
said circular flange surrounding the lower end of said pipe extending below the bottom of said compartment unit,
a circular metal plate having a series of openings to permit the heated water within the reservoir to enter said pipe,
a carafe for receiving the heated and filtered coffee,
said carafe having circular neck and a spout,
a metal band circumscribing said carafe neck,
a sloping, depending handle attached to said carafe to permit the fingers of the user to lift the carafe with its heated contents without the heat effecting the fingers, an extension member depending the same angle as the carafe wall at the inner end of said handle for strengthening said handle and firmly holding the carafe, a circular basket for seating said basket upon said carafe, a removable cup-like cap at the base of said basket, said removable cap having a silk screen upon its bottom and ribs to support said silk screen, said basket having a circular spreader cover, said spreader cover having a large shallow dished circular central portion, small openings on the bottom of said spreader cover to permit the hot water to pass into said basket, a paper filter cup for receiving the coffee grind and for positioning within said basket with its bottom resting upon said silk screen, a circular support wall member for positioning within said paper filter cup to support and prevent the walls of said filter cup from collapsing upon receiving the hot water, said support wall member having a large number of small openings in its wall to permit the hot water to drain through the coffee grind within the filter cup, a dished cover for said support member, said dished cover having a number of small openings therein for breaking the force of the hot water and to permit the hot water to drain into said support member and said filter cup containing the coffee grind and flows into said carafe, a metal circular warming plate attached to said base and raised above the lowermost part thereof for placing said carafe thereon, said base of said beverage maker having front and rear opposed legs raising the base of said beverage maker to permit air to flow beneath said base and said warming plate, electrical wiring means, thermal control means and switches on said beverage maker to permit the water in said reservoir to be heated to the desired temperature, to open said thermal valve at the bottom of said compartment unit and said reservoir, and to maintain said warming plate at the desired temperature for serving beverage.

8. An automatic beverage maker according to claim 7, said beverage maker comprising an upper housing, vertical support walls, a removable back and a base, a compartment unit for said upper housing, said compartment unit having an outwardly directed flange for seating said compartment unit within said upper housing, said upper housing having upright walls and a bottom, a circular cup-shaped water reservoir within and attached to said compartment unit, a top cover for said upper housing, said top cover having a depending inwardly angled flange extending around said cover to direct any water or condensed steam from leaving said upper housing, an inwardly directed shoulder within said upper housing and below the top of said walls thereof for supporting said outwardly directed flange of said compartment unit, supports attached to said compartment unit and extending below the bottom thereof for firmly attaching said compartment unit to said upper housing, markings on said water reservoir to indicate the level of 4, 6, 8 and 10 cups of water, a metal heating coil attached to the bottom of said compartment unit for supplying heat to said compartment unit and said water reservoir, a ceramic member centrally located within and on the bottom of said water reservoir, said ceramic member having a central pipe passing through the bottoms of said compartment unit, said water reservoir and slightly below the bottom of said upper housing, a thermal valve at the base of said compartment unit and said reservoir permitting the heated water to drain from the reservoir at the desired temperature, said circular flange acting as a heat shield between said heating coil and pipe, a depending circular outwardly dished flange on the bottom of said upper compartment unit, said circular dished flange surrounding the lower end of said pipe extending below the bottom of said compartment unit, a circular metal plate having a series of openings to permit the heated water within the reservoir to enter said pipe, a carafe for receiving the heated and filtered coffee, said carafe having circular neck and a spout, a metal band circumscribing said carafe neck, a sloping handle attached to said carafe to permit the fingers of the user to lift the carafe with its heated contents without the heat effecting the fingers, an extension member depending the same angle as the carafe wall at the inner end of said handle for strengthening said handle and firmly holding the carafe, a circular basket having a shoulder for seating said basket upon the upper edge of said carafe, a removable cup-like cap at the base of said basket, said removable cap having a silk screen upon its bottom and ribs to support said silk screen, said basket having a circular spreader cover, said spreader cover having a large shallow dished circular central portion the angular wall of which extends above surface of said spreader cover for receiving the heated water from said pipe, small tapered openings on the bottom of said dished central portion of said spreader cover to permit the hot water to pass into said basket, a paper filter cup for receiving the coffee grind and for positioning within said basket and extending downward so that its bottom rests upon said silk screen, a circular support wall member for positioning within said paper filter cup to support and prevent the walls of said filter cup from collapsing upon receiving the hot water, said support wall member having no bottom and a large number of small openings in its wall to permit the hot water to drain through the coffee grind within the filter cup, a dished cover for said support member, said dished cover having a bottom and an outwardly directed for seating said dished cover upon the upper edge of said support member, said bottom having a number of small openings therein for breaking the force of the hot water and to permit the hot water to drain into said support member and said filter cup containing the coffee grind whereby said hot water passes through the coffee grind and filters the coffee extract through said paper filter cup and said silk screen flowing into said carafe, a metal circular warming plate for placing said carafe thereon, said warming plate attached to said base of said beverage maker so that said warming plate is raised above the lowermost part of said base of said beverage maker, means for attaching said warming plate to said base of said beverage maker permitting an air space between said warming plate and said base of said beverage maker, said base of said beverage maker having front and rear opposed legs raising the base of said beverage maker to permit air to flow beneath said base and said warming plate, electrical wiring means, thermal control means and switches on said beverage maker to permit the water in said reservoir to be heated to the desired temperature, to open said thermal valve at the bottom of said compartment unit and said reservoir, and to maintain said warming plate at the desired temperature for serving beverage, a cap for seating upon the neck of said carafe for serving the beverage within the carafe, said cap having a depending flange adapted to fit within the neck of said carafe, an opening in said depending flange of said cap for lining up with said spout to permit the beverage within said carafe to be poured while said cap is on said carafe.

9. An automatic beverage maker according to claim 8, said beverage maker comprising an upper housing, vertical support walls, a removable back and a base, a compartment unit for said upper housing, said compartment unit having an outwardly directed flange for seating said compartment unit within said upper housing, said upper housing having upright walls and a bottom, a circular cup-shaped water reservoir within and attached to said compartment unit, an air space within said compartment unit surrounding said water reservoir, a top cover for said upper housing, said top cover having depending inwardly angled flange extending around said cover to direct any water or condensed steam from leaving said upper housing, a depressed shallow circumferential portion in said top cover, an inwardly directed shoulder within said upper housing and below the top of said walls thereof for supporting said outwardly directly flange of said compartment unit, supports attached to said compartment unit and extending below the bottom thereof for firmly attaching said compartment unit to said upper housing, markings on said water reservoir to indicate the level of 4, 6, 8 and 10 cups of water, a metal heating coil attached to the bottom of said compartment unit for supplying heat to said compartment unit and said water reservoir, a ceramic member centrally located within and on the bottom of said water reservoir, said ceramic member having a central pipe passing through the bottoms of said compartment unit, said water reservoir and slightly below the bottom of said upper housing, a thermal valve at the base of said compartment unit and said reservoir permitting the heated water to drain from the reservoir at the desired temperature, a rubber sleeve for said pipe, a depending circular flange on the bottom of said compartment unit, said circular flange surrounding said rubber sleeve and acting as a heat shield between said heating coil and pipe, a depending circular outwardly dished flange on the bottom of said upper compartment unit, said circular dished flange surrounding the lower end of said pipe extending below the bottom of said compartment unit, a circular metal plate having a series of openings to permit the heated water within the reservoir to enter said pipe, a carafe for receiving the heated and filtered coffee, said carafe having circular neck and a spout, a metal band circumscribing said carafe neck, a sloping, depending handle extending a short distance from said carafe to permit the fingers of the user to lift the carafe with its heated contents without the heat effecting the fingers, an extension member depending the same angle as the carafe wall at the inner end of said handle for strengthening said handle and firmly holding the carafe, a long screw passing through an opening in the upper part of said handle for attaching to the ends of said metal band to see screw and retaining said metal band tightly around the neck of said carafe, a circular basket having a shoulder for seating said basket upon the upper edge of said carafe, a removable cup-like cap at the base of said basket, said removable cap having a silk screen upon its bottom and ribs to support said silk screen, said basket having a circular spreader cover which extends slightly beyond the upper wall of said basket for easy lifting from said basket by the user, said spreader cover having a downwardly directed circumferential flange for seating said spreader cover within the upper edge of said basket, said spreader cover having a large shallow dished circular central portion the angular wall of which extends above the upper surface of said spreader cover for receiving the heated water from said pipe, small tapered openings on the bottom of said dished central portion of said spreader cover to permit the hot water to pass into said basket, a paper filter cup for receiving the coffee grind and for positioning within said basket and extending downward so that its bottom rests upon said silk screen, a circular support wall member for positioning within said paper filter cup to support and prevent the walls of said filter cup from collapsing upon receiving the hot water, said support wall member having no bottom and a large number of small openings in its wall to permit the hot water to drain through the coffee grind within the filter cup, a dished cover for said support member, said dished cover having a bottom and an outwardly directed flange for seating said dished cover upon the upper edge of said support member, said bottom having a number of small openings therein for breaking the force of the hot water and to permit the hot water to drain into said support member and said filter cup containing the coffee grind whereby said hot water passes through the coffee grind and filters the coffee extract through said paper filter cup and said silk screen and flows into said carafe, a metal circular warming plate for placing said carafe thereon, said warming plate attached to said base of said beverage maker so that said warming plate is raised above the lowermost part of said base of said beverage maker, said warming plate having a short upright wall and an outwardly directed flange, means for attaching said warming plate to said base of said beverage maker permitting an air space between said warming plate and said base of said beverage maker, said base of said beverage maker having front and rear opposed legs raising the base of said beverage maker to permit air to flow beneath said base and said warming plate, electrical wiring means, thermal control means and switches on said beverage maker to permit the water in said reservoir to be heated to the desired temperature, to open said thermal valve at the bottom of said compartment unit and said reservoir, and to maintain said warming plate at the desired temperature for serving beverage, a cap for seating upon the neck of said carafe for serving the beverage within the carafe, said cap having a depending flange adapted to fit within the neck of said carafe, an opening in said depending flange of said cap for lining up with said spout to permit the beverage within said carafe to be poured while said cap is on said carafe.

* * * * *